(12) United States Patent
Salter et al.

(10) Patent No.: US 9,493,113 B2
(45) Date of Patent: Nov. 15, 2016

(54) PHOTOLUMINESCENT CARGO AREA ILLUMINATION

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 14/519,226

(22) Filed: Oct. 21, 2014

(65) Prior Publication Data
US 2015/0138806 A1    May 21, 2015

Related U.S. Application Data

(63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
| | | |
|---|---|---|
| *B60Q 1/00* | (2006.01) | |
| *B60Q 1/26* | (2006.01) | |
| *B60Q 11/00* | (2006.01) | |
| *B60Q 3/06* | (2006.01) | |
| *B60Q 3/00* | (2006.01) | |
| *B60Q 3/02* | (2006.01) | |

(52) U.S. Cl.
CPC ............... *B60Q 3/06* (2013.01); *B60Q 3/008* (2013.01); *B60Q 3/0233* (2013.01)

(58) Field of Classification Search
CPC .......... B60Q 3/008; B60Q 3/0233; B60Q 3/06
USPC ................................ 362/488, 496, 509–510
See application file for complete search history.

(56) References Cited

U.S. PATENT DOCUMENTS

| | | | |
|---|---|---|---|
| 5,709,453 | A | 1/1998 | Krent et al. |
| 6,117,362 | A | 9/2000 | Yen et al. |
| 6,290,278 | B1 | 9/2001 | Loveland |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Vichit Chea; Price Heneveld LLP

(57) ABSTRACT

A vehicle illumination apparatus is disclosed. The illumination apparatus comprises a storage compartment forming an interior cavity disposed in a cargo area and a cover. The cover comprises a handle configured to facilitate access to the storage compartment from a closed position to an open position. The illumination apparatus further comprises at least one photoluminescent portion disposed proximate the storage compartment configured to illuminate at least a portion of the handle in the closed position.

19 Claims, 5 Drawing Sheets

(56) References Cited

U.S. PATENT DOCUMENTS

| | | |
|---|---|---|
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10147288 A1 | 9/2001 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

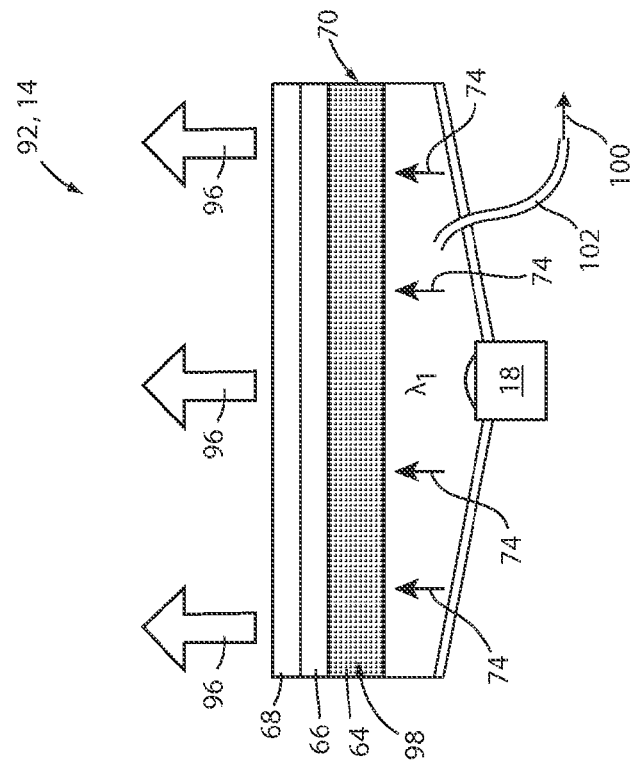
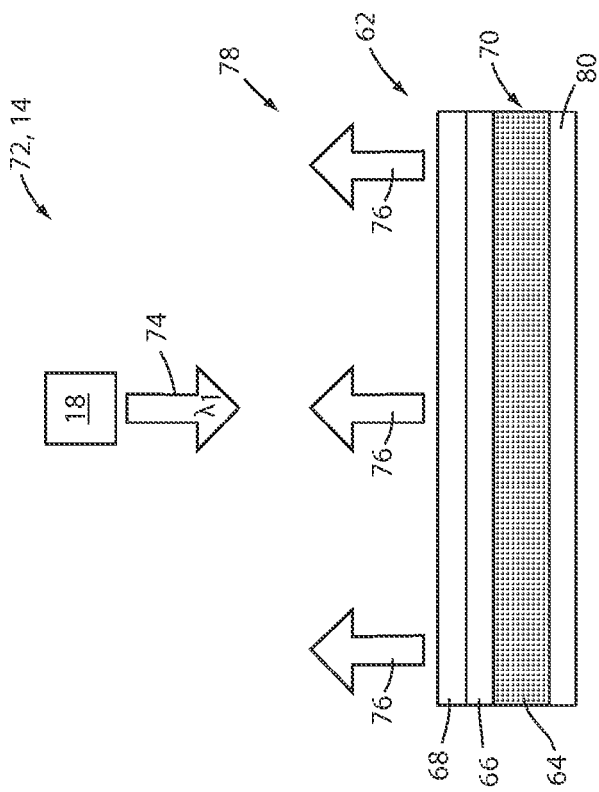
FIG. 4
FIG. 3

PHOTOLUMINESCENT CARGO AREA ILLUMINATION

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned relate applications are hereby incorporated by reference in their entirety.

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, a vehicle illumination apparatus is disclosed. The illumination apparatus comprises a storage compartment forming an interior cavity disposed in a cargo area and a cover. The cover comprises a handle configured to facilitate access to the storage compartment from a closed position to an open position. The illumination apparatus further comprises at least one photoluminescent portion disposed proximate the storage compartment configured to illuminate at least a portion of the handle in the closed position.

According to another aspect of the present invention, a vehicle illumination apparatus is disclosed. The illumination apparatus comprises a storage compartment forming an interior cavity disposed in a cargo area and a cover. The cover comprises a handle configured to facilitate access to the storage compartment from a first position to a second position. The illumination apparatus further comprises at least one photoluminescent portion disposed proximate the storage compartment configured to illuminate at least a portion of the handle in a back-lit configuration in the first position.

According to yet another aspect of the present invention, a vehicle illumination apparatus is disclosed. The illumination apparatus comprises a light source disposed at least partially in a storage compartment. The storage compartment forms an interior cavity disposed in a cargo area of the vehicle. The illumination apparatus further comprises a cover having a handle configured to facilitate access to the storage compartment from a closed position to an open position. At least one photoluminescent portion is disposed proximate the storage compartment and configured to illuminate at least a portion of the storage compartment in the open position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is schematic view of a front-lit configuration of a lighting apparatus configured to convert a first wavelength of light to at least a second wavelength;

FIG. 4 is schematic view of a back-lit configuration of a lighting apparatus configured to convert a first wavelength of light to at least a second wavelength;

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate at least a portion of a cargo compartment of a vehicle. In some implementations, at least one light source may be utilized to illuminate a surface of the cargo compartment. The at least one light source may be configured to emit light at a first wavelength or an excitation emission to excite a photoluminescent portion disposed on the surface. The photoluminescent portion may be configured to convert the first wavelength into a second wavelength or an output emission. The first wavelength may correspond to a first color of light and the second wavelength may correspond to a second color of light, different from the first color. While the various implementations of the lighting system described herein refer to specific structures demonstrated in reference to at least one automotive vehicle, it will be appreciated that the vehicle lighting system may be utilized in a variety of applications.

Figure 1:
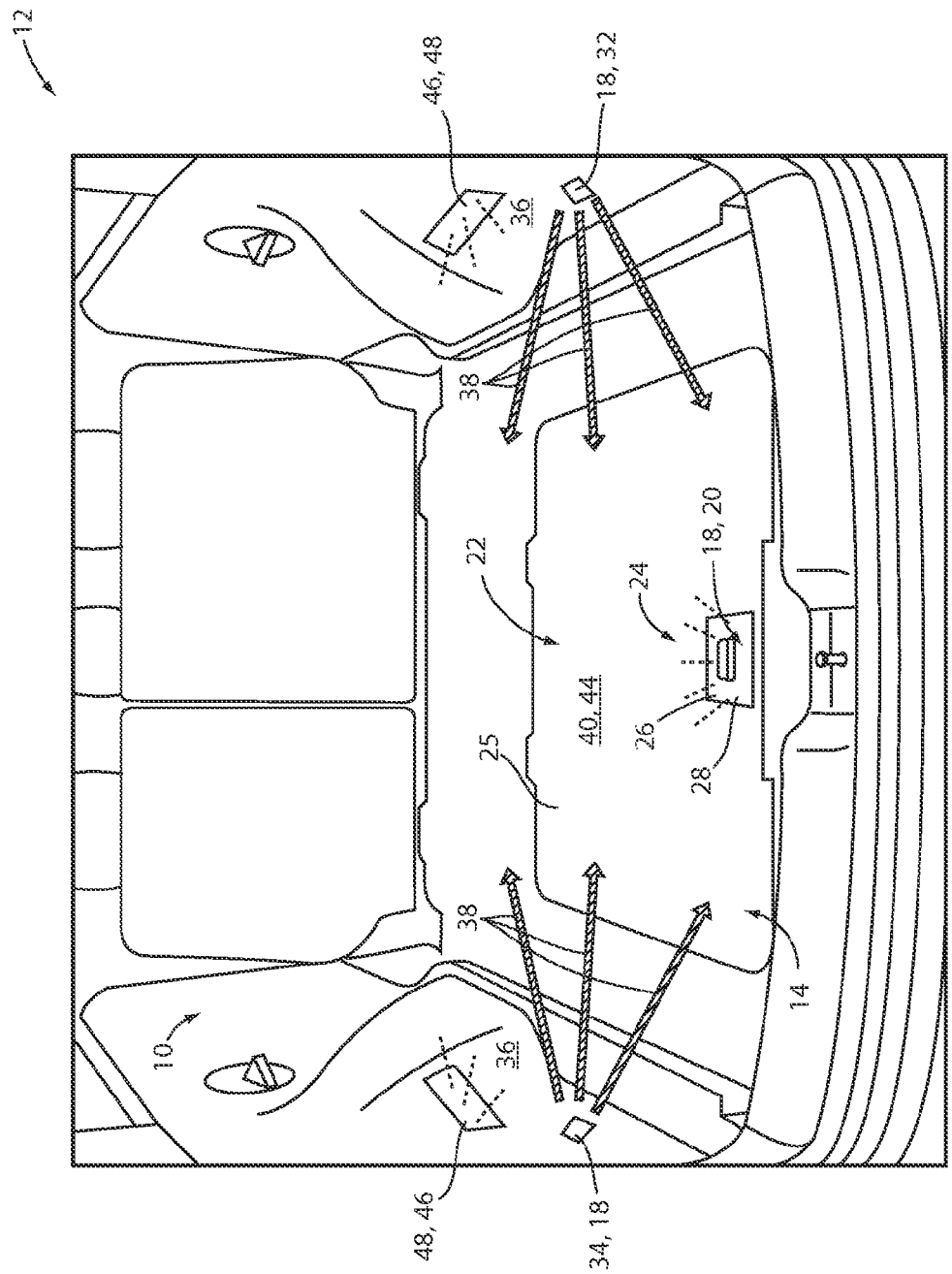
FIG. 1 is a perspective view of a cargo compartment of an automotive vehicle demonstrating a lighting system.

Referring to FIG. 1, a cargo compartment 10 of a vehicle 12 is shown comprising a lighting system 14. The lighting system 14 comprises at least one light source 18 that may be controlled by one or more lighting modules incorporated in the vehicle 12. For example, a lighting module of the vehicle 12 may be configured to selectively activate the light source 18 in response to a lift gate, deck lid, or door being oriented in the open position. The light source 18 may also be activated in response to a vehicle drive and/or ignition state. The light source 18 may be activated by a switch or sensor, for example a toggle switch or proximity sensor. In this way, the lighting system 14 may be configured to selectively illuminate at least a portion of the cargo compartment 10 in response to a state and/or condition of a variety of portions of the vehicle 12.

The lighting system 14 may comprise at least one photoluminescent portion configured to illuminate in response to receiving a first excitation emission from a first light source 20 of the at least one light source 18. A storage compartment 22 of the cargo compartment 10 may comprise a storage light apparatus 24 disposed proximate a cover 25 of the storage compartment 22. In some implementations, the first light source 20 may be configured to illuminate a handle 26 when the cover 25 is arranged in the closed position shown in FIG. 1. In this configuration, the lighting system 14 may utilize a first photoluminescent portion 28 disposed in the handle 26 to provide ambient light to illuminate at least a portion of the handle 26.

The light source 18 of the storage light apparatus 24 may further be operable to emit the first excitation emission toward a second photoluminescent portion disposed on an interior surface of the cover 25 in an open position. The cover 25 is demonstrated in the open position and discussed further in reference to FIG. 5B. In the open position, the first emission may be transmitted through an open volumetric portion disposed between the first light source 20 and the second photoluminescent portion. In response to receiving the first emission, the second photoluminescent may become excited and emit light as an output emission to illuminate an interior cavity formed by the storage compartment 22. In this configuration, the storage light apparatus 24 may be configured to illuminate the handle 26 to facilitate access to the storage compartment 22 and further illuminate an interior cavity of the storage compartment 22 to assist in utilizing the storage compartment 22. Each of the output emissions may be demonstrated as dashed lines in FIGS. 1, 5A and 5B.

The lighting system 14 may further comprise a second light source 32 and/or a third light source 34 disposed proximate a side portion 36 of the cargo compartment 10. The second and third light sources 32 and 34 may be configured to emit a second excitation emission 38 of light toward an interior surface 40 of the cargo compartment 10. The interior surface 40 may comprise a third photoluminescent portion 44 that may become excited in response to receiving the second excitation emission 38. In this configuration, the lighting system 14 may be operable to illuminate the cargo compartment 10 in ambient light or an output emission emitted from the interior surface 40.

The second light source 32 and the third light source 34 may further be configured to illuminate at least one utility light 46 in a back-lit configuration. In such implementations, a portion of the second excitation emission 38 may be directed from each of the light sources 32 and 34 via a light guide disposed in the side portion 36. The light guide may be of an at least partially light transmissive material and configured to transmit the portion of the second excitation emission 38 to the utility light 46 to excite a fourth photoluminescent portion 48 disposed in the utility light 46. In this configuration, the portion of the second excitation emission 38 transmitted through the light guide may be operable to excite the utility light 46 in the back-lit configuration. In this way, the utility light 46 may be operable to emit an output emission to illuminate the cargo compartment 10.

Each of the photoluminescent portions discussed herein may be configured to convert an excitation emission emitted from the at least one light source 18 to at least one output emission configured to illuminate at least a portion of the cargo compartment 10. The excitation emission may comprise the first wavelength. The output emission may comprise a second wavelength of the light comprising at least one wavelength having a longer wavelength than the first wavelength. As discussed herein, the first photoluminescent portion 28 and other photoluminescent portions may be configured to have photochemical properties configured to convert the first wavelength of light from the light source 18 to the second wavelength. The second wavelength may comprise additional wavelengths, including various combinations of wavelengths to emit light from the lighting system 14.

The first wavelength of the excitation emissions may correspond to a violet or deep blue color of light. The first wavelength may have a peak wavelength of approximately less than 500 nm. The second wavelength of the one or more output emissions may correspond to one or more wavelengths of light comprising at least one wavelength greater in length than the first wavelength. In some implementations, the second wavelength may correspond to a plurality of wavelengths that may cause the output emissions to appear as significantly white light. In this configuration, the light emitted from the light source 18 at the first wavelength is configured to excite the photoluminescent portions. In response to the excitation caused by the light at the first wavelength, the photoluminescent portions may be configured to convert the first wavelength to emit the output emissions to illuminate at least a portion of the cargo compartment 10.

Figure 2A:
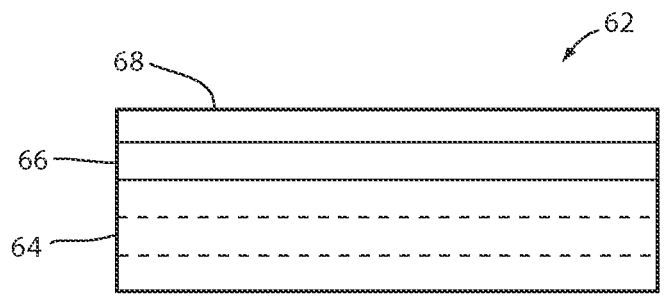
FIG. 2A illustrates a photoluminescent structure rendered as a coating.
Figure 2B:
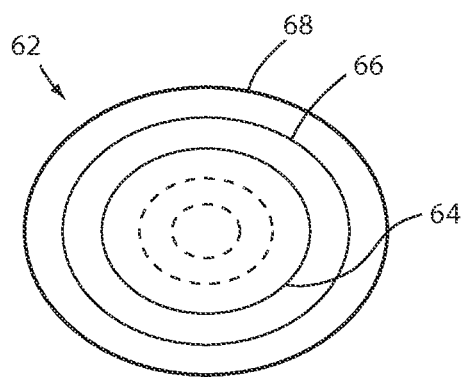
FIG. 2B illustrates the photoluminescent structure rendered as a discrete particle.
Figure 2C:
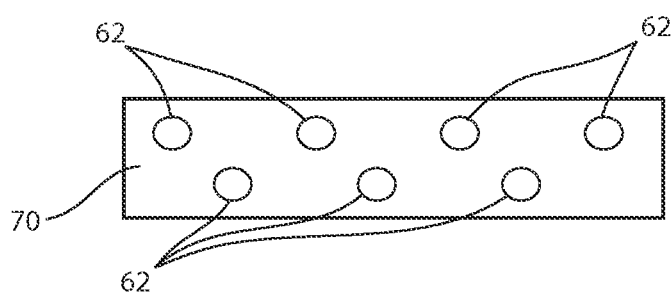
FIG. 2C illustrates a plurality of photoluminescent structures rendered as discrete particles and incorporated into a separate structure.

Referring to FIGS. 2A-2C, a photoluminescent structure 62 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. As described herein, a vehicle fixture may correspond to any surface or portion of the vehicle, for example the handle 26, the interior surface of the cover 25, and/or the utility light 46. The photoluminescent structure 62 may correspond to the photoluminescent portions as discussed herein, for example the first photoluminescent portion 28, the second photoluminescent portion, the third photoluminescent portion 44, and/or the fourth photoluminescent portion 48. At the most basic level, the photoluminescent structure 62 includes an energy conversion layer 64 that may be provided as a single layer or a multilayer structure, as shown through broken lines in FIGS. 2A and 2B.

The energy conversion layer 64 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 62 comprising an energy conversion layer (e.g. conversion layer 64). The energy conversion layer 64 may be prepared by dispersing the photoluminescent material in a polymer matrix 70 to form a homogenous mixture using a variety of methods. Such methods may include preparing the energy conversion layer 64 from a formulation in a liquid carrier medium and coating the energy conversion layer 64 to a desired planar and/or non-planar substrate of a vehicle fixture. The energy conversion layer 64 may be deposited on a vehicle fixture by painting, screen printing, spraying, slot coating, dip coating, roller coating, and bar coating. Additionally, the energy conversion layer 64 may be prepared by methods that do not use a liquid carrier medium.

For example, a solid state solution (homogenous mixture in a dry state) of one or more photoluminescent materials may be incorporated in a polymer matrix 70 to provide the energy conversion layer 64. The polymer matrix 70 may be formed by extrusion, injection molding, compression molding, calendaring, thermoforming, etc. In instances where one or more energy conversion layers 64 are rendered as particles, the single or multilayered energy conversion layers 64 may be implanted into a vehicle fixture or panel. When the energy conversion layer 64 includes a multilayer formulation, each layer may be sequentially coated. Additionally, the layers can be separately prepared and later laminated or embossed together to form an integral layer. The layers may also be coextruded to prepare an integrated multilayered energy conversion structure.

Referring back to FIGS. 2A and 2B, the photoluminescent structure 62 may optionally include at least one stability layer 66 to protect the photoluminescent material contained within the energy conversion layer 64 from photolytic and thermal degradation. The stability layer 66 may be configured as a separate layer optically coupled and adhered to the energy conversion layer 64. The stability layer 66 may also be integrated with the energy conversion layer 64. The photoluminescent structure 62 may also optionally include a protection layer 68 optically coupled and adhered to the stability layer 66 or any layer or coating to protect the photoluminescent structure 62 from physical and chemical damage arising from environmental exposure.

The stability layer 66 and/or the protection layer 68 may be combined with the energy conversion layer 64 to form an integrated photoluminescent structure 62 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 62. Once formed, the photoluminescent structure 62 may be applied to a chosen vehicle fixture.

In some implementations, the photoluminescent structure 62 may be incorporated into a vehicle fixture as one or more discrete multilayered particles as shown in FIG. 2C. The photoluminescent structure 62 may also be provided as one or more discrete multilayered particles dispersed in the polymer matrix 70 that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Referring to FIG. 3, the lighting system 14 is generally shown according to a front-lit configuration 72. In this configuration, the light or a first excitation emission 74 emitted from the at least one light source 18 is converted to a second output emission 76 by the energy conversion layer 64. The second output emission 76 may correspond to an output emission generated by the second photoluminescent portion 78 disposed on the interior surface of the cover 25. The first excitation emission 74 comprises a first wavelength $\lambda_1$, and the output emissions comprise at least the second wavelength. The lighting system 14 comprises the photoluminescent structure 62 disposed on or in at least one photoluminescent portion. The photoluminescent structure 62 may be rendered as a coating and applied to a substrate 80 of a vehicle fixture, for example the interior surface of the cover 25. The photoluminescent material may also be dispersed as a polymer matrix 70 corresponding to the energy conversion layer 64.

In some implementations, the energy conversion layer 64 may further include the stability layer 66 and/or protection layer 68. In response to the at least one light source 18 being activated, the first excitation emission 74 is received by the energy conversion layer 64 and converted from the first wavelength $\lambda_1$ to an output emissions having at least the second wavelength, for example, the second output emission 76. Each of the output emissions may comprise a plurality of wavelengths configured to emit any color of light from each of the photoluminescent portions discussed herein. In some implementations, each of the output emissions may correspond to different colors of light. The colors of light of the output emissions may correspond to the photochemical structure of each of the photoluminescent portions. In this way, each of the output emissions may be configured to emit different colors of light in response to receiving an excitation emission.

In various implementations, the lighting system 14 comprises at least one photoluminescent material incorporated in the polymer matrix 70 and/or energy conversion layer 64 and is configured to convert the excitation emission at the first wavelength $\lambda_1$ to the output emissions having at least the second wavelength. In order to generate the plurality of wavelengths, the energy conversion layer 64 may comprise one or more photoluminescent materials configured to emit the output emissions as wavelengths of light in the red, green, and/or blue color spectrums. Such photoluminescent materials may further be combined to generate a wide variety of colors of light for the output emissions. For example, the red, green, and blue-emitting photoluminescent materials may be utilized in a variety of proportions and combinations to control the output color of the output emissions.

Each of the photoluminescent materials may vary in output intensity, output wavelength, and peak absorption wavelengths based on a particular photochemical structure and combinations of photochemical structures utilized in the energy conversion layer 64. As an example, the second output emission 76 may be changed by adjusting the wavelength of an excitation emission to activate the photoluminescent materials at different intensities to alter the color of the second output emission 76. In addition to, or alternatively to the red, green, and blue-emitting photoluminescent materials, other photoluminescent materials may be utilized alone and in various combinations to generate the output emissions in a wide variety of colors. In this way, the lighting system 14 may be configured for a variety of applications to provide a desired lighting color and effect for a vehicle.

To achieve the various colors and combinations of photoluminescent materials described herein, the lighting system 14 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

The at least one light source 18 may also be referred to as an excitation source and is operable to emit at least the first excitation emission 74 or any of the excitation emissions discussed herein. The at least one light source 18 may comprise any form of light source, for example halogen lighting, fluorescent lighting, light emitting diodes (LEDs), organic LEDs (OLEDs), polymer LEDs (PLEDs), solid state lighting or any other form of lighting configured to output the excitation emissions. The excitation emissions from the at least one light source 18 may be configured such that the first wavelength $\lambda_1$ corresponds to at least one absorption wavelength of the one or more photoluminescent materials of the energy conversion layer 64 and/or polymer matrix 70. In response to receiving the light at the first wavelength $\lambda_1$, the energy conversion layer 64 may be excited and output the one or more output wavelengths, for example, the second emission having the second wavelength $\lambda_2$. The first excitation emission 74 provides an excitation source for the energy conversion layer 64 by targeting absorption wavelengths of a particular photoluminescent material or combination thereof utilized therein. As such, the lighting system 14 may configured to output the output emissions at a desired light intensity and color.

In an exemplary implementation, the at least one light source 18 comprises an LED configured to emit the first wavelength $\lambda_1$ which may correspond to a blue spectral, violet, and/or ultra-violet color range. The blue spectral color range comprises a range of wavelengths generally expressed as blue light (~440-500 nm). In some implementations, the first wavelength $\lambda_1$ may comprise a wavelength in the ultraviolet and near ultraviolet color range (~100-450 nm). In an exemplary implementation, the first wavelength $\lambda_1$ may be approximately equal to 470 nm. Though particular wavelengths and ranges of wavelengths are discussed in reference to the first wavelength $\lambda_1$, the first wavelength $\lambda_1$ may generally be configured to excite any photoluminescent material.

In an exemplary implementation, the first wavelength $\lambda_1$ may be approximately less than 500 nm. The blue spectral color range and shorter wavelengths may be utilized as an excitation source for the lighting system 14 due to these wavelengths having limited perceptual acuity in the visible spectrum of the human eye. By utilizing shorter wavelengths for the first wavelength $\lambda_1$, and converting the first wavelength with the conversion layer 64 to at least one longer wavelength, the lighting system 14 creates a visual effect of light originating from the photoluminescent structure 62. In this configuration, the lighting system 14 may provide for cost effective system to provide lighting in a variety of locations.

As discussed herein, each of the plurality of wavelengths corresponding to the output emissions may correspond to a significantly different spectral color range. The second wavelength may correspond to a plurality of wavelengths configured appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm in one embodiment. The plurality of wavelengths may be utilized to generate a wide variety of colors of light from the each of the photoluminescent portions converted from the first wavelength $\lambda_1$.

Referring to FIG. 4, the lighting system 14 is generally shown according to a back-lit configuration 92 to convert first excitation emission 74 from the at least one light source 18 to a first output emission 96. The back-lit configuration 92 comprises an energy conversion layer 64 and/or photoluminescent material dispersed in a polymer matrix 70. Similar to the energy conversion layer 64 demonstrated in reference to the front-lit configuration 72, the energy conversion layer 64 may be configured to be excited and output the one or more wavelengths corresponding to the second wavelength in response to receiving the first excitation emission 74. The plurality of wavelengths of the first output emission 96 may be configured to emit any color of light from the first photoluminescent portion 28 in response to the excitation of the energy conversion layer 64. The color of the light corresponding to the first output emission 96 may be controlled by utilizing particular types and/or ratios of photoluminescent materials as discussed herein. The first output emission 96 may correspond to the light output from the handle 26 and/or the utility light 46.

In some implementations, the first photoluminescent portion 28 is configured to convert a first portion 98 of the first excitation emission 74 to the first output emission 96. In the back-lit configuration 92, the lighting apparatus may further be configured to output a second portion 100 of the first excitation emission 74 via a light guide 102. The second portion 100 of the first excitation emission 74 may remain at the first wavelength $\lambda_1$ such that the second portion 100 of the first wavelength may be utilized to generate an output emission from an additional photoluminescent portion in communication with the light source 18. The light guide 102 may be of an at least partially light transmissive material operable to transmit the second portion 100 of an excitation emission to the additional photoluminescent portion.

Figure 5:
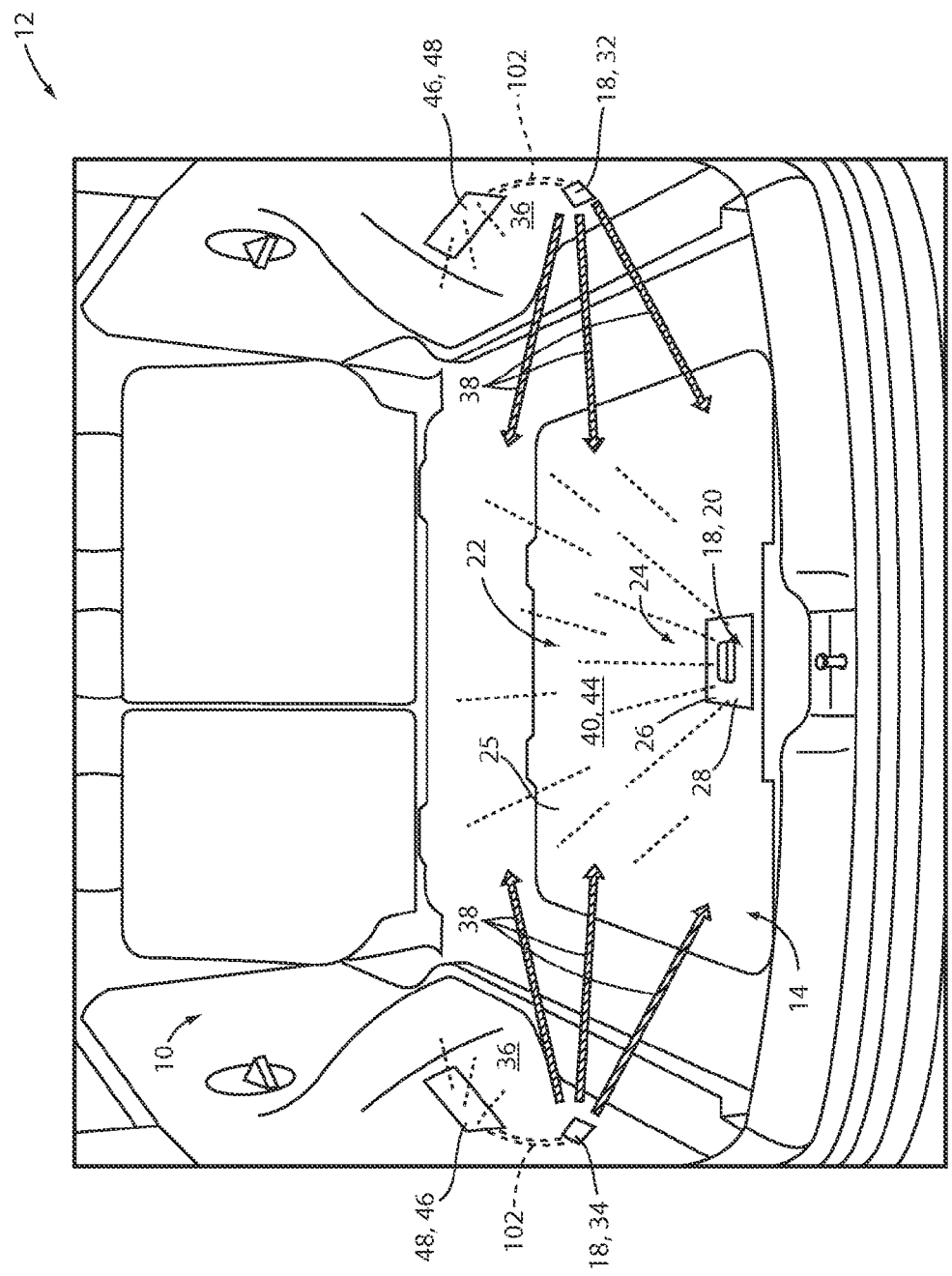
FIG. 5 a perspective view of a cargo compartment of an automotive vehicle demonstrating a cover of a storage compartment arranged in a closed position.
Figure 6:
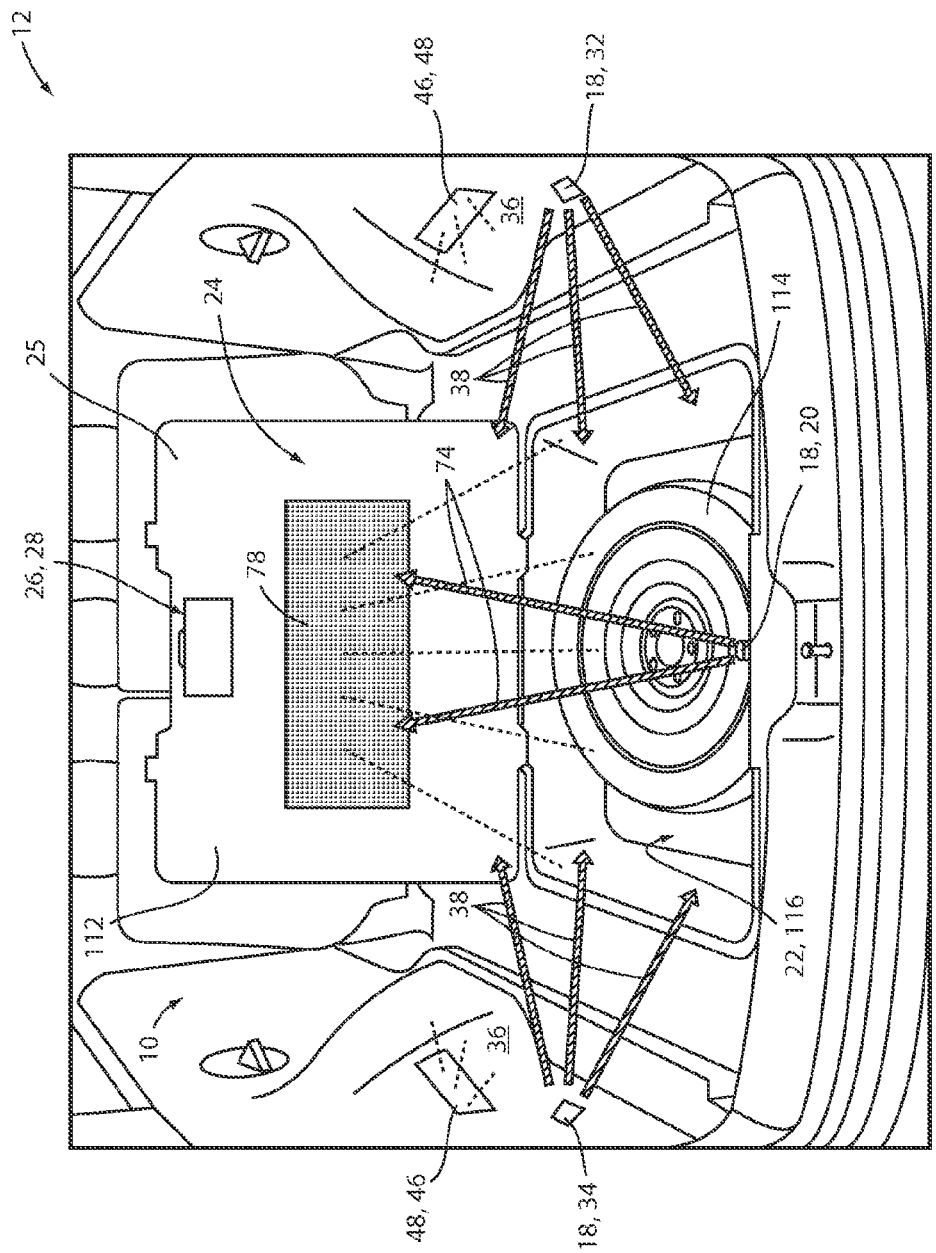
FIG. 6 is a perspective view of a vehicle having a light source configured to illuminate a portion of a surface beneath a lift gate of the vehicle.

Referring now to FIGS. 5 and 6, the lighting system 14 is shown demonstrating the storage compartment 22 in the closed configuration and the open configuration, respectively. In the closed configuration, the first light source 20 may be configured to emit the first excitation emission 74 to illuminate the first photoluminescent portion 28 of the handle 26 in the back-lit configuration 92. In the open configuration, the light source 18 of the storage light apparatus 24 may further be operable to emit the first excitation emission 74 toward the second photoluminescent portion 78 disposed on an interior surface 112 of the cover 25. In the open configuration, the first emission 74 may be transmitted through an open volumetric portion disposed between the first light source 20 and the second photoluminescent portion 78. In this way, the lighting system 14 is operable to illuminate the storage compartment 22 and any contents therein, for example a spare tire 114. In this configuration, the storage light apparatus 24 may be configured to illuminate the handle 26 to facilitate access to the storage compartment 22 and further illuminate an interior cavity 116 of the storage compartment 22 to assist in utilizing the storage compartment 22.

The lighting system 14 may further comprise a second light source 32 and/or a third light source 34 disposed proximate the side portion 36 of the cargo compartment 10. The second and third light sources 32 and 34 may be configured to emit a second excitation emission 38 of light toward an interior surface 40 of the cargo compartment 10. The interior surface 40 may comprise a third photoluminescent portion 44 that may become excited in response to receiving the second excitation emission 38. In this configuration, the lighting system 14 may be operable to illuminate the cargo compartment 10 in ambient light or an output emission emitted from the interior surface 40.

The second light source 32 and the third light source 34 may further be configured to illuminate at least one utility light 46 in the back-lit configuration. In such implementations, a portion of the second excitation emission 38 may be directed from each of the light sources 32 and 34 via a light guide 102 disposed in the side portion 36. The light guide 102 may be of an at least partially light transmissive material and configured to transmit the portion of the second excitation emission 38 to the utility light 46 to excite a fourth photoluminescent portion 48 disposed in the utility light 46. In this configuration, the portion of the second excitation emission 38 transmitted through the light guide 102 may be operable to excite the utility light 46 in the back-lit configuration. In this way, the utility light 46 may be operable to emit an output emission to illuminate the cargo compartment 10.

Each of the photoluminescent portions discussed herein may be configured to convert an excitation emission having the first wavelength of the light emitted from the at least one light source 18 to at least one output emission configured to illuminate at least a portion of the cargo compartment 10. The output emission may comprise a second wavelength of the light comprising at least one wavelength having a longer wavelength than the first wavelength. The photoluminescent portions may be configured to emit a variety of colors in response to the excitation in response to receiving the first wavelength of light. In this way, the disclosure provides for a lighting system that may be configured to generate ambient lighting to illuminate a cargo compartment in a variety of colors.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle illumination apparatus comprising:
   a storage compartment forming an interior cavity disposed in a cargo area of a vehicle;
   a cover comprising a handle configured to facilitate access to the storage compartment from a closed position to an open position; and
   at least one photoluminescent portion disposed proximate the storage compartment and configured to illuminate at least a portion of the handle in the closed position, wherein the at least one photoluminescent portion is further operable to illuminate at least a portion of the storage compartment in the open position.

2. The illumination apparatus according to claim 1, wherein the at least one photoluminescent portion comprises a first photoluminescent portion and a second photoluminescent portion.

3. The illumination apparatus according to claim 2, wherein the first photoluminescent portion is configured to illuminate at least a portion of the handle in the closed position.

4. The illumination apparatus according to claim 2, wherein the second photoluminescent portion is configured to illuminate at least a portion of the cover in the open position.

5. The illumination apparatus according to claim 2, further comprising a light source configured to emit a first emission of light configured to excite the first photoluminescent portion and the second photoluminescent portion.

6. The illumination apparatus according to claim 5, wherein the light source is disposed at least partially within the storage compartment.

7. The illumination apparatus according to claim 5, wherein the handle is configured to illuminate in a back-lit configuration.

8. A vehicle illumination apparatus comprising:
   a storage compartment forming an interior cavity disposed in a cargo area of a vehicle;
   a cover comprising a handle configured to facilitate access to the storage compartment from a first position to a second position; and at least one photoluminescent portion disposed proximate the storage compartment configured to illuminate at least a portion of the handle in a back-lit configuration corresponding to the first position.

9. The illumination apparatus according to claim 8, wherein the first position corresponds to a closed position and the second position corresponds to an open position.

10. The illumination apparatus according to claim 9, wherein the at least one photoluminescent portion is further operable to illuminate at least a portion of the storage compartment in the open position.

11. The illumination apparatus according to claim 8, wherein the at least one photoluminescent portion comprises a first photoluminescent portion and a second photoluminescent portion.

12. The illumination apparatus according to claim 11, wherein the first photoluminescent portion is configured to illuminate at least a portion of the handle in the closed position.

13. The illumination apparatus according to claim 11, wherein the second photoluminescent portion is configured to illuminate at least a portion of an interior surface of the cover in the open position.

14. A lighting apparatus for a vehicle comprising:
a light source disposed at least partially in a storage compartment, the storage compartment forming an interior cavity disposed in a cargo area of a vechicle;
a cover comprising a handle configured to facilitate access to the storage compartment from a closed position to an open position; and
at least one photoluminescent portion disposed proximate the storage compartment configured to illuminate at least a portion of the storage compartment in the open position.

15. The lighting apparatus according to claim 14, wherein the light source is configured to illuminate the at least one photoluminescent portion in the closed position and the open position.

16. The lighting apparatus according to claim 14, wherein the at least one photoluminescent portion comprises a first photoluminescent portion and a second photoluminescent portion.

17. The lighting apparatus according to claim 14, wherein the second photoluminescent portion is configured to illuminate a portion of the handle in the closed position.

18. The illumination apparatus according to claim 17, wherein light source is configured to illuminate the second photoluminescent portion in a back-lit configuration.

19. The illumination apparatus according to claim 17, wherein light source is configured to illuminate the first photoluminescent portion in a front-lit configuration.

\* \* \* \* \*